United States Patent

[11] 3,586,037

[72] Inventor Ray R. Zimmer
       Lewisville, Tex.
[21] Appl. No. 827,711
[22] Filed May 26, 1969
[45] Patented June 22, 1971
[73] Assignee Victor Equipment Company
       Denton, Tex.

[54] SINGLE STAGE, COMPENSATED PRESSURE REGULATOR
10 Claims, 4 Drawing Figs.

[52] U.S. Cl. ................................................. 137/505.18,
                                                     137/505.42
[51] Int. Cl. ....................................................F16k31/365
[50] Field of Search............................................137/505.18,
                                                     116.3, 116.5

[56] References Cited
UNITED STATES PATENTS

| | | | |
|---|---|---|---|
| 2,599,577 | 6/1952 | Norgren | 137/505.18 X |
| 2,707,966 | 5/1955 | Taplin | 137/505.18 X |
| 3,071,146 | 1/1963 | Friedell | 137/116.3 |
| 3,286,726 | 11/1966 | Guy | 137/505.18 |
| 3,495,607 | 2/1970 | Shugarman | 137/505.18 X |

FOREIGN PATENTS

| | | | |
|---|---|---|---|
| 846,106 | 8/1960 | Great Britain | 137/505.18 |

*Primary Examiner*—Harold W. Weakley
*Attorney*—Wofford and Felsman

ABSTRACT: This specification discloses a single stage, compensated pressure regulator characterized by having the pressure in a lower cylindrical aperture beneath a shaft of a core body vented through the small shaft and core body such that it is the same pressure as in the low-pressure chamber connected with an outlet, and by having the high inlet pressure blocked from the lower cylindrical aperture. Also disclosed is a particularly preferred embodiment in which roll pin stock is employed as a stem for the core assembly, effecting communication between the low-pressure chamber and the lower cylindrical aperture without the expense of forming component parts of extremely close tolerances, and without requiring minute care and skilled workmanship. Specific details of construction are included in the disclosures.

PATENTED JUN22 1971

3,586,037

INVENTOR.
Ray R. Zimmer
BY
Wofford & Felsman
ATTORNEYS

SINGLE STAGE, COMPENSATED PRESSURE REGULATOR

BACKGROUND OF THE INVENTION

1. Field of the Invention

This invention relates to pressure regulators. More particularly, it relates to compensated regulators such as are employed on cylinders of compressed gases like oxygen, nitrogen, and helium; in which it is desired to control an outlet pressure at an exact value from a cylinder affording an inlet pressure which may range from as low as 100 pounds per square inch gauge (p.s.i.g.) or less to as high as 2640 p.s.i.g., or slightly less than 3000 p.s.i.g.

2. Description of the Prior Art

Cylinders of compressed gas have their discharge pressure reduced through a low-pressure regulator similar to the one described hereinafter and having essentially a core assembly operated into positions that are opened, intermediate or closed as necessary to attempt to effect balanced forces between a heavy spring opposed by a diaphragm to which low-pressure gas pressure is applied. In the prior art regulators, an unbalance toward closure has been effected by a light spring and high pressure acting on a shaft of a core body fitted within a lower cylindrical aperture. As will be appreciated, the high-pressure gas at the inlet to the valve may vary from a few tens of p.s.i.g. to a few thousands of p.s.i.g., consequently varying the force on the core body shaft. As a result, the outlet pressure, or regulated low pressure, tended to increase as the inlet pressure decreased, since a higher regulated low pressure was required to compensate for the decreasing unbalance toward closure. This required a continual adjustment to maintain an exact outlet pressure.

Since this continual adjustment was frequently undesirable, dual stage, compensated regulators were employed. The dual stage regulators are essentially two regulators, the regulated low pressure from one stage being the inlet to the next stage. The dual stage regulators were almost twice as expensive and were subject to additive regulation error, and still transmitted about 15 percent of the uncompensated error that would otherwise be imparted by a single stage regulator.

For many years, applicant and other pressure regulator manufacturers sought an economically feasible, single stage, compensated regulator for these relatively low-pressure applications. Since the low-pressure regulators employed core assemblies having small, almost jewellike, precision components, ordinary approaches to solving the problem were not feasible. For example, the stem between the core body and the diaphragm member was so small that drilling of a passageway therethrough was economically impractical; much less teeing a second passageway from the low-pressure chamber into the first passageway. Moreover, such a passageway would not have communicated with the lower cylindrical aperture beneath the shaft of the core body assembly, requiring further apertures in the core body. Furthermore, such apertures and passageways would have created the risk of conveying high-pressure from the high-pressure chamber directly into the low-pressure chamber and bypassing the regulator valve in the core assembly, and were discarded as being infeasible. Separate passageways for establishing communication beneath the core assembly and the low-pressure passageway were subject to the same difficulties and risks in that extra passageways would have been too costly and the high-pressure gas could have been vented directly to the low-pressure chamber. They were, accordingly, also discarded as infeasible.

DESCRIPTION OF THE PREFERRED EMBODIMENT(S)

Figures 1, 2, 3, 4:
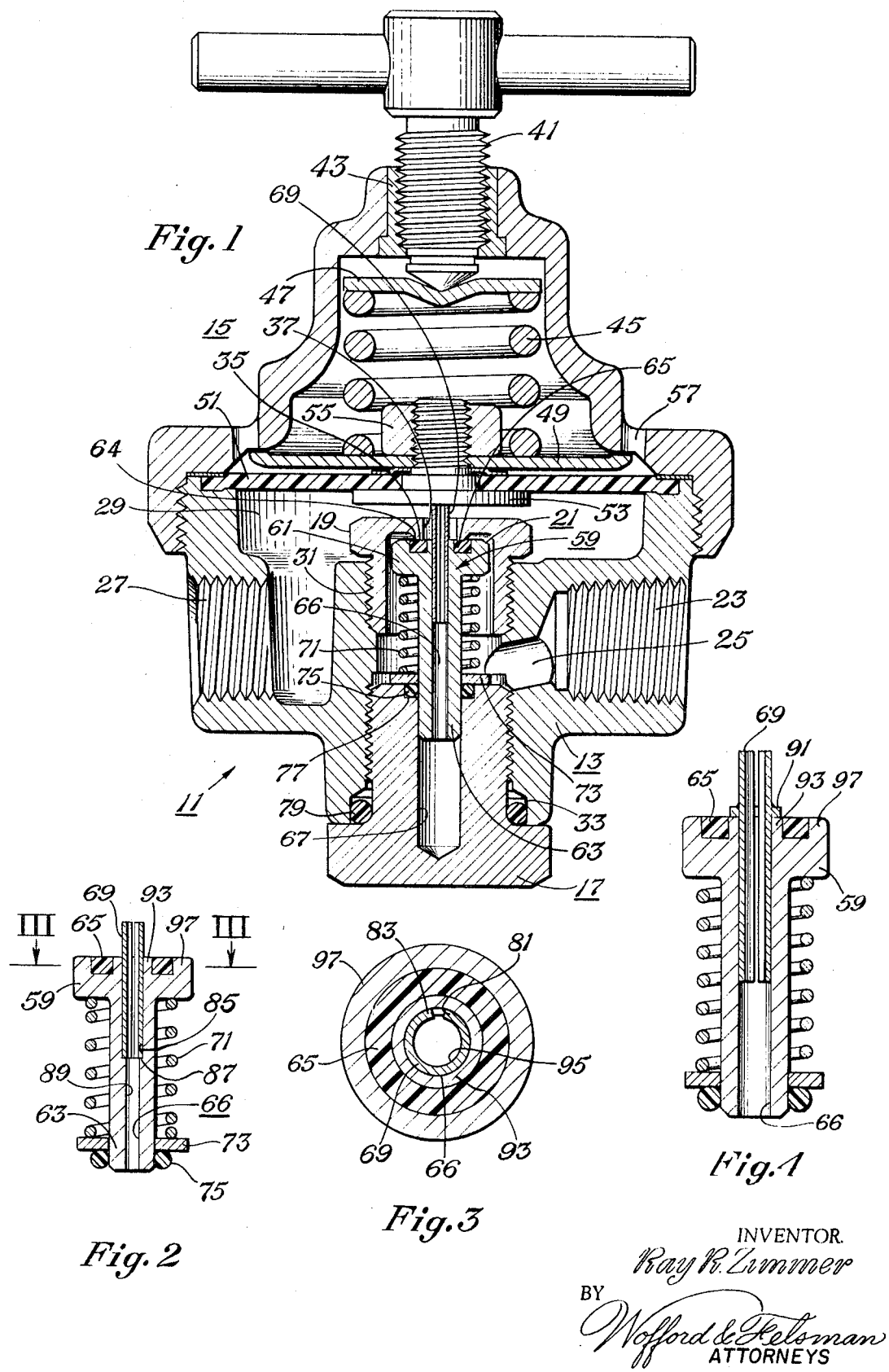
FIG. 1 is a side cross-sectional view of one embodiment of the invention.
FIG. 2 is a side cross-sectional view of a core assembly employed in the embodiment of FIG. 1.
FIG. 3 is a cross-sectional view taken along the lines III-III of FIG. 2.
FIG. 4 is a side cross-sectional view of another core assembly which can be employed in an embodiment of the invention.

In FIG. 1 there is illustrated a side cross-sectional view of regulator 11. Regulator 11 comprises the main subassemblies of body 13, regulator top 15, bottom plug assembly 17, bushing 19 and core assembly 21.

Body 13 has a high-pressure inlet 23 and a high-pressure chamber 25 in communication therewith. Body 13 also has a low-pressure exit, or outlet, 27 and a low-pressure chamber 29 in communication therewith. Core aperture 31 is intermediate low-pressure chamber 29 and high-pressure chamber 25 and communicates with each. Body 13 also has bottom seating means 33 for receiving a bottom sealing means.

Bushing 19 is removably affixed within core aperture 31. Bushing 19 has flow regulating seating means illustrated by ring lip 35 annularly disposed about flow regulating aperture 37.

Regulator top 15 is removably affixed to body 13 and has a compression adjusting means illustrated by threaded stud 41 screwed through tapped bushing 43 integrally mounted with regulator top 15. Spring means comprising spring 45, compression plate 47, and bottom retainer plate 49 are contiguous with compression adjusting means and responsive thereto. Diaphragm means, including diaphragm 51 sealingly mounted on diaphragm member 53 responsively engages the spring means and seals the top side of low-pressure chamber 29. Specifically, diaphragm member 53 penetrates through bottom retainer plate 49 and screws into retainer nut 55. Vent apertures 57 equalize the pressure in regulator top 15 with ambient pressure. Thus, outlet pressure in low-pressure chamber 29 is true guage pressure, being automatically compensated for changing atmospheric pressure.

Core assembly 21 is inserted into bushing 19 from the bottom. Core assembly 21 consists essentially of a core body 59 having an upper portion 61 of enlarged diameter and a lower shaft 63 of reduced diameter. Resilient sealing means 65 is fitted within recessed ring 64 in upper portion 61. Resilient sealing means 65 is, ordinarily, a ring of firm but resilient plastic such as nylon or a firm elastomeric material such as neoprene rubber. Sealing means 65 seats against lip 35 to block or regulate flow of fluid through flow regulating aperture 37 into low-pressure chamber 29.

Aperture means 66 penetrates longitudinally through core body 59 for establishing communication between lower cylindrical aperture 67 of bottom plug assembly 17 and low-pressure chamber 29.

Extension rod stem 69 conformingly engages aperture means 66 and protrudes therefrom to engage diaphragm member 53. Stem 69 has a passageway traversing from its upper end to its lower end and communicating with aperture means 66 and with low-pressure chamber 29. Stem 69 must be strong enough to transmit the force from diaphragm member 53 to core body 59 and unseat sealing means 65 from lip 35 to allow fluid to pass therebetween. To transmit this force without slipping, stem 69 must be fixedly but removably mounted by any suitable means within body 59.

Spring means; such as, spring 71; urges core body 59 upwardly to engage sealing means 65 with lip 35 and engage extension rod stem 69 with diaphragm member 53. Spring retaining means; such as, upper portion 61 and washer 73; holds spring 71 in place about lower shaft 63 and enables the spring to urge the body upwardly. Washer 73 also serves to retain a shaft sealing means in place around shaft 63.

Shaft sealing means; such as, O-ring 75; seals against lower shaft 63 for blocking the flow of fluid from high-pressure chamber 25 into lower cylindrical aperture 67. The O-ring 75 fits within seating means; such as, ring 77; juxtaposed the entrance to lower cylindrical aperture 67. O-ring 75 also serves to dampen out harmonics, or vibrations, during dynamic regulation.

Bottom plug assembly 17 is removably affixed to body 13. Bottom plug assembly 17 has a bottom sealing means; such as, large O-ring 79; sealingly engaging bottom seating means 33. Also, as indicated hereinbefore, bottom plug assembly 17 has lower cylindrical aperture 67 and ring 77. Lower cylindrical aperture 67 is aligned with core aperture 31 and serves as a guiding receptacle for shaft 63 of core body 59. Ring 77 is arranged concentrically about lower cylindrical aperture 67, and serves as seating means for shaft sealing means 75.

In operation, low-pressure regulator 11 is connected with a high-pressure cylinder of gas (not shown) via inlet 23 and appropriate conduit connection (also not shown). With zero pressure set by compression adjusting means in regulator top 15, pressure in high-pressure chamber 25, coupled with upward urging from spring 71, forces core body upward to engage resilient sealing means 65 with lip 35 and prevent flow of fluid therepast.

When threaded stud 41 is screwed downwardly, applying pressure to spring 45 and moving diaphragm member 53 downwardly, force is transmitted via stem 69 to unseat resilient sealing means 65 and allow gas to flow from high-pressure chamber 25 to low-pressure chamber 29. Outlet 27 of low-pressure chamber 29 having been previously connected with an appropriate device; such as, a hose and a welding torch; pressure in low-pressure chamber 29 will build up to a value determined by the degree of compression afforded spring 45. As pressure increases in low-pressure chamber 29, the pressure acting on diaphragm 51, on diaphragm member 53 counterbalances the force of spring 45, allowing spring 71, the slight force due to pressure from high-pressure chamber 25 and the low-pressure under shaft 63 to seat resilient sealing means 65 against lip 35, serving as flow regulating seating means, to block further flow of fluids.

The closing force and the opening force due to pressure in high-pressure chamber 25 are substantially balanced. There may be a slight differential area within the outer diameter of lip 35 and about stem 69 on which the high pressure can act because of engineering and manufacturing tolerances. Any such small area renders any unbalanced force insignificant as compared to the force acting on the very large diaphragm area in low-pressure chamber 29 counterbalancing the large compressive force on spring 45. In this way, effects of varying inlet pressures are mitigated such that an essentially constant pressure is maintained within low-pressure chamber 29 regardless of the inlet pressure.

Lower cylindrical aperture 67 is in communication, via aperture means 66 and passageway within stem 69 with low-pressure chamber 29. During regulation, lower cylindrical aperture 67 maintains the relatively constant, regulated low pressure, and hence, a constant upwardly acting, or closing, force on core body 59. The low pressure also acts on the area within flow regulating aperture 37 to provide an opening force. The areas exposed to the low pressure are substantially equal to produce substantially balanced opening and closing forces. For example, I have found that diameters of 0.187 inch in lower cylindrical aperture 67 and of 0.193 inch in flow regulating aperture 37 work well.

Once the device employing the fluid from outlet 27 begins to operate; for example, the welding torch operates; pressure decreases in low-pressure chamber 29, unbalancing the force opposing spring 45 which again depresses core body 59 opening a flow passageway between resilient sealing means 65 and lip 35. Again the fluids pass through flow regulating aperture 37 to maintain a balanced pressure in low-pressure chamber 29. Once the flow of fluid past resilient sealing means 65 and lip 35 is equal to the flow being used by the device, equilibrium is again established by balancing of the forces. As indicated hereinbefore, any unbalance creates a reaction. For example, should pressure in low-pressure chamber 29 become too high the force imparted to diaphragm 51 would become greater than the compressive force of spring 45 and move diaphragm member 53 upwardly. Stem 69 would follow and block or reduce the flow of gases between resilient sealing means 65 and lip 35. Conversely, should the pressure in low-pressure chamber 29 become too low, spring 45 would move diaphragm member 53 downwardly, depressing stem 69 and increasing the gas flow passageway between resilient sealing means 65 and lip 35.

Pressure in low-pressure chamber can be increased by further screwing in threaded stud 41, increasing the compressive force on spring 45, hence, requiring greater pressure in chamber 29 to counterbalance this force.

From the foregoing, and as indicated hereinbefore, it is imperative that stem 69 retain its relative position with respect to core body 59. Expressed otherwise, stem 69 will have a first length in aperture means 66 and must maintain this first length constant such that there is a constant length extending from core body 59 and engaging diaphragm member 53.

A particularly preferred embodiment achieving this result is illustrated in FIG. 2. Therein, stem 69 is formed of roll pin stock spring fitted in aperture means 66 as illustrated in cross section in FIG 3. Roll pin stock forming stem 69 has a C-shaped cross section. Accordingly, the roll pin stock can be compressed such that ends 81 and 83 are forced toward each other. The roll pin stock has a modulus of elasticity that affords a spring fit when the roll pin stock is fitted within first aperture 85 of aperture means 66. The modulus of elasticity and the resulting natural springiness of properly fitted roll pin stock ordinarily affords enough frictional force to retain stem 69 in place in aperture means 66. To ensure there is no relative movement between stem 69 and core body 59, however, a shoulder 87 is formed within aperture means 66. Specifically, a second aperture 89 having a diameter smaller than that of first aperture 85 is drilled longitudinally through lower shaft 63 but communicating with first aperture 85.

FIG. 4 illustrates another embodiment in which aperture means 66 has a substantially constant diameter throughout core body 59 and stem 69 has a protruding shoulder 91 thereon. Protruding shoulder 91 may be formed by inserting a C-clamp in grooves in the roll pin stock. Any other way; such as, reducing the diameter of the lower portion of stem 69 inserted in aperture means 66; may be employed. Shoulder 91 engages inner ring 93 of core body 59 to ensure there is no relative movement between stem 69 and core body 59 when transmitting force from diaphragm member 53 to unseat resilient sealing means 65. Roll pin stock serving as stem 69 is uniquely advantageous because its springiness effects a conforming fit within the aperture in which it is placed, and because it has sufficient strength to impart the requisite force without distortion. Moreover, roll pin stock inherently contains a passageway communicating between low-pressure chamber 29 and aperture means 66.

FIG. 3 illustrates a cross section of the embodiments shown in FIGS. 2 and 4 wherein the C-shaped roll pin stock has a passageway 95 traversing the length of the roll pin stock and communicating with low-pressure chamber 29 and aperture means 66. No tedious, expensive drilling of extremely small apertures in precision parts is required. Further with respect to FIG. 3, inner ring 93 is arranged concentrically about stem 69. Resilient sealing means 65 is in the form of an annular ring disposed between inner ring 93 and outer ring 97, both of body 59.

One of the advantages of the invention is that no exotic new materials are required and the materials ordinarily employed in constructing these relatively low-pressure regulators may be employed in this invention. Specifically, it is preferred to employ metallic, corrosion-resistant alloys; such as, brass or other copper alloys; in forming the body and other components subject to the high pressure from the high-pressure gas cylinder. Ordinarily, steel is employed in the springs to obtain the requisite force in the relatively small area and volume provided. The diaphragm is ordinarily of a tough, elastomeric material; such as, neoprene rubber. The O-rings, too, are ordinarily made of synthetic rubber; such as, neoprene. The resilient sealing means is, ordinarily, plastic like nylon or rubber like neoprene, as described hereinbefore. The roll pin stock may be of aluminum, copper alloys, steel or any other material having the requisite moduli of elasticity and compressibility. Any material having the requisite property can be substituted for the named materials in any component of the regulator described hereinbefore.

The single stage compensated regulator has been described with bottom plug assembly 17 for facilitating in site repair and core aperture 31 receiving bushing 19 for economy. I have found that it is frequently advantageous to manufacture body 13 with the bottom plug integral therewith and avoid use of the bottom sealing means. In this way, elements are emplaced through the top and assembly is simplified. These regulators are removed from service for repair. Use of bushing 19 in core aperture 31 for forming seating means such as lip 35 effects more economical manufacture than forming the lips integrally into the body. For example, if the lips are incorrectly formed, only the bushing need by discarded instead of an entire body 13, as would have to be done if lip 35 were incorrectly formed integrally into the body. The lips 35 can be integrally formed into the body, however, if desired.

Nomenclature herein has been given with respect to an upright regulator as shown in FIG. 1. The regulator can be employed in any attitude and the respective components will perform their functions regardless of their relative positions, such as "upper" and "lower".

This invention makes economically feasible a single stage, compensated regulator for operations heretofore deemed impractical; such as, regulating pressures less than 300 p.s.i.g. The single stage, compensated regulator of the invention has been found to be advantageous over even the dual stage regulators employed heretofore, since the regulators of the invention are more stable and transmit even less of the uncompensated change in force due to decreasing pressure in the high-pressure chamber caused by decreasing pressure in the gas cylinder connected to the inlet.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A core assembly employed in a low-pressure regulator having a flow regulating seating means, a lower cylindrical aperture for guiding a core assembly, and having a diaphragm member in a low pressure chamber, and regulating pressure below 3000 p.s.i. comprising:
   a. core body having an upper portion and a lower shaft of a diameter conformingly engaging said lower cylindrical aperture of said low-pressure regulator;
   b. recessed ring in said upper portion of said core body;
   c. resilient sealing means in said recessed ring adapted to seat against said seating means for sealing in said low-pressure regulator and for regulating flow of fluids therepast;
   d. aperture means penetrating longitudinally through said core body for establishing communication between said low-pressure chamber and, ultimately, said lower cylindrical aperture of said low-pressure regulator; and
   e. a stem comprising a first length of roll pin stock of C-shaped cross section with a first length spring-fitted in said aperture means and having a modulus of elasticity sufficient to maintain said first length constant and resist movement of said stem longitudinally of said aperture means under normal operating forces and maintain a second length protruding therefrom and engaging said diaphragm member of said low-pressure regulator; said stem having a passageway traversing from its upper end to its lower end for establishing communication between said low-pressure chamber and said aperture means.

2. The core assembly of claim 1 wherein there is provided spring means for positively urging said core body toward closed position to engage said sealing means with said seating means and said stem with said diaphragm member; spring retaining means for holding said spring means in place and for effecting said urging of said core body closed; and shaft sealing means for sealing against said lower shaft and for blocking said high-pressure fluids from invading said lower cylindrical aperture of said low-pressure regulator.

3. The core assembly of claim 2 wherein said core body has said upper portion of a second diameter greater than said diameter of said lower shaft, forms a shoulder, and said spring means engages said shoulder for said urging said core body toward said closed position.

4. The core assembly of claim 1 wherein said seating means of said regulator comprises a ring lip formed on a portion of said regulator separating said low-pressure chamber from a high-pressure chamber in said regulator and said resilient sealing means comprises a ring annularly disposed between an inner ring and an outer ring of said core body.

5. The core assembly of claim 1 wherein said aperture means comprises a first aperture penetrating longitudinally through said upper portion of said core body and a second aperture penetrating longitudinally through said lower shaft of said core body and communicating with said first aperture; and said stem conformingly engages said first aperture.

6. In a low-pressure regulator for reducing pressure in a high-pressure chamber less than 3000 p.s.i. to a few p.s.i. in a low-pressure chamber and employing an adjustable spring opposed by pressure on a diaphragm having a centrally disposed diaphragm member, a flow regulating seating means for sealing, a lower cylindrical aperture for guiding a core assembly, and a core assembly including a core body having an upper portion of enlarged diameter and a lower shaft of reduced diameter, a resilient sealing means in the top of said core body and conformingly fitting said seating means for blocking and regulating flow of fluid from said high-pressure chamber into said low-pressure chamber, and a stem arranged on the low-pressure side of said seating means, extending from said core body and engaging said diaphragm member, and operable to unseat said resilient sealing means upon appropriate unbalance of force on said diaphragm and allow fluid to flow from said high-pressure chamber to said low-pressure chamber, the improvement comprising:
   a. said lower shaft impermeable to fluid from said high-pressure chamber;
   b. second seating means at the entrance to said lower cylindrical aperture;
   c. shaft sealing means about said lower shaft and juxtaposed said second seating means for blocking flow of fluid from said high-pressure chamber into said lower cylindrical aperture;
   d. aperture means penetrating longitudinally through said core body and communicating with said low-pressure chamber and with said lower cylindrical aperture; and
   e. said stem consisting essentially of a first length of roll pin stock of C-shaped cross section spring-fitted in said aperture means, means maintaining said first length constant, and a second length extending from said core body and engaging said diaphragm member; said means maintaining said first length constant comprising a modulus of elasticity of said roll pin stock effecting a spring fit in said aperture means having a frictional retaining force greater than any force tending to move said roll pin stock within said aperture means in normal operation; said roll pin stock having sufficient strength to transmit the force from said diaphragm member to said core body without distortion and having a passageway running longitudinally therethrough and communicating with said aperture means and said low-pressure chamber.

7. The low-pressure regulator of claim 6 wherein said means maintaining said first length constant also includes a shoulder within said aperture means upon which said roll pin stock sits.

8. The low-pressure regulator of claim 6 wherein said means maintaining said first length constant also includes a shoulder formed on said roll pin stock and sitting upon a wall portion of said aperture means.

9. A single stage, compensated regulator for regulating pressure below 3000 p.s.i. comprising:
   a. a body having a high-pressure inlet and a high-pressure chamber in communication therewith a low-pressure outlet and a low-pressure chamber in communication therewith; a core aperture intermediate and communicating with said high-pressure chamber and said low-pressure chamber; and a bottom plug assembly having a lower cylindrical aperture aligned with said core aperture, and a shaft seal seating means at the entrance to, contiguous with, and concentric about said lower cylindrical aperture;
   b. a regulator top removably affixed to said body and having a compression adjusting means and spring means contiguous therewith, and a diaphragm means responsively engages in said spring means, having a diaphragm member and adapted to seal one side of said low-pressure chamber;
   c. a bushing removably affixed within said core aperture and having a flow regulating seating means annularly disposed about a flow regulating aperture,
   d. a core assembly consisting essentially of:
      i. a core body having an upper portion of enlarged diameter and a lower shaft of reduced diameter for conformingly engaging said lower cylindrical aperture of said bottom plug assembly;
      ii. recessed ring in said upper portion of said core body;
      iii. resilient sealing means in said recessed ring adapted to seat against said flow regulating seating means in said bushing for sealing and for regulating flow of fluid therepast;
      iv. aperture means penetrating longitudinally through said core body and communicating with said lower cylindrical aperture and with said low-pressure chamber;
      v. a stem conformingly engaging said aperture means and protruding therefrom and engaging said diaphragm member of said regulator top, and having a passageway traversing from its upper end to its lower end and communicating with said low-pressure chamber and said aperture means; said stem being concentrically disposed within said flow regulating seating means and said resilient sealing means, having a C-shaped cross section and having a modulus of elasticity sufficient to effect a tight frictional fit with said aperture means sufficient to transmit force from said diaphragm member to said core body without movement of said stem within said aperture means;
      vi. spring means urging said core body upwardly to engage said resilient sealing means with said flow regulating seating means and said stem with said diaphragm member;
      vii. shaft sealing means in said shaft seal seating means and sealing against said lower shaft and blocking said fluid in said high-pressure chamber from invading said lower cylindrical aperture; and
      viii. washer means retaining said shaft sealing means and said spring in their respective places;
   whereby said regulator maintains a relatively constant, preset pressure opposing said spring means contiguous said compression adjusting means regardless of the pressure in said high-pressure chamber.

10. The single stage, compensated regulator of claim 8 wherein said aperture means comprises a first aperture penetrating longitudinally through said upper portion of said core body and a second aperture penetrating longitudinally through said lower shaft of said core body and communicating with said first aperture, said stem conformingly engages said first aperture, and said stem is prevented from moving within said aperture by engaging a shoulder contiguous thereto.